No. 649,581. Patented May 15, 1900.
J. G. LANDMAN.
FISHING NET FRAME.
(Application filed Oct. 15, 1897.)
(No Model.) 2 Sheets—Sheet 1.

WITNESSES:
Irwin W. Pierce.
Evelyn M. Pierce.

INVENTOR
John G. Landman,
BY A. M. Pierce.
ATTORNEY

THE NORRIS PETERS CO., PHOTO-LITHO., WASHINGTON, D. C.

No. 649,581.   
J. G. LANDMAN.  
FISHING NET FRAME.  
(Application filed Oct. 15, 1897.)  
Patented May 15, 1900.

(No Model.)   
2 Sheets—Sheet 2.

WITNESSES:  
Irwin W. Pierce.  
Evelyn M. Pierce.

INVENTOR  
John G. Landman.  
BY A. M. Pierce  
ATTORNEY.

UNITED STATES PATENT OFFICE.

JOHN G. LANDMAN, OF NEW YORK, N. Y.

FISHING-NET FRAME.

SPECIFICATION forming part of Letters Patent No. 649,581, dated May 15, 1900.

Application filed October 18, 1897. Serial No. 655,245. (No model.)

*To all whom it may concern:*

Be it known that I, JOHN G. LANDMAN, a citizen of the United States, residing in New York, (Brooklyn,) Kings county, State of New York, have invented a new and useful Improvement in Fishing-Net Frames, of which the following is a specification.

My invention relates especially to devices employed for holding and spreading nets for landing fish, and has for its object the provision of a simple, cheap, and effective spreading-frame, the parts whereof may be folded together and removed from the handle or rigidly spread and connected with such handle at pleasure.

To attain the desired end, my invention consists, essentially, in certain novel and useful combinations or arrangements of parts and peculiarities of construction and operation, all of which will be hereinafter first fully described and then pointed out in the claim.

Figure 1:
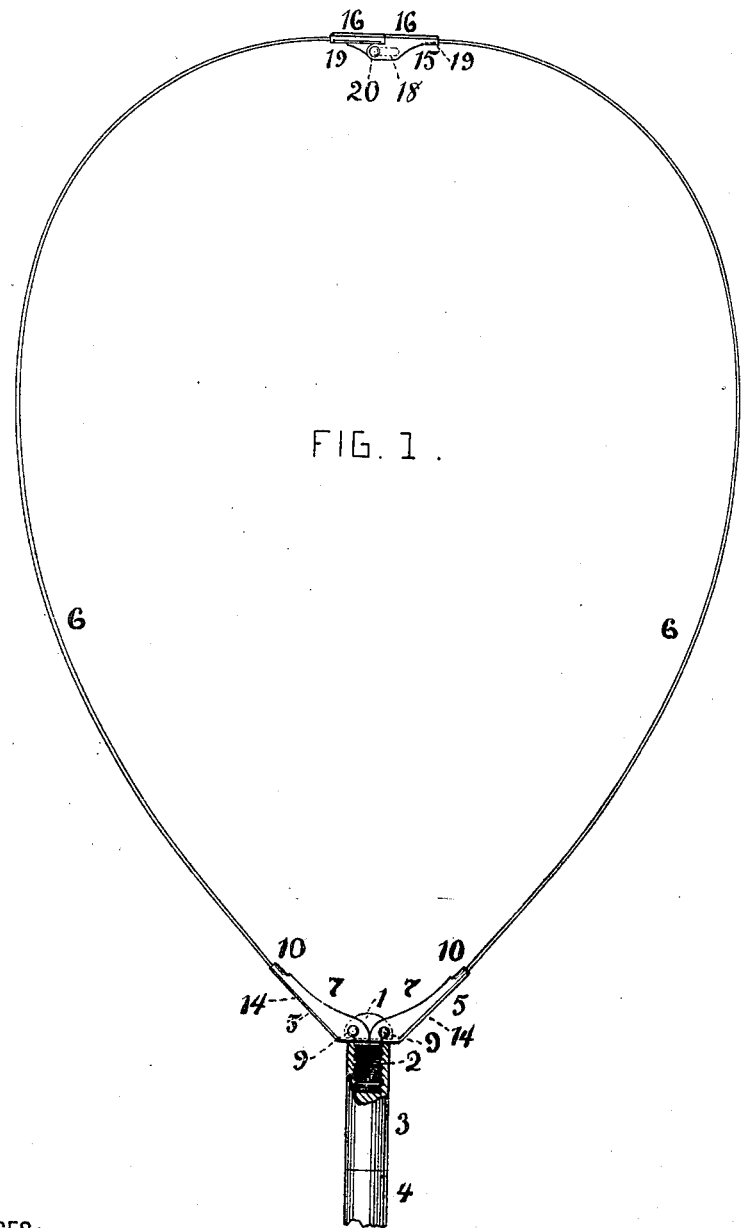
Figure 3:
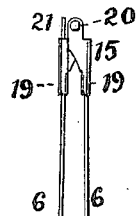
Figure 3:
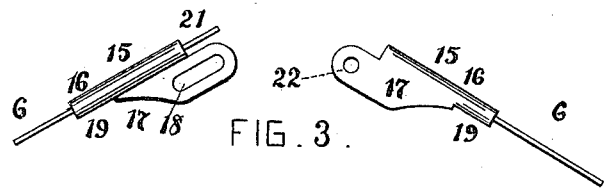
Figure 4:
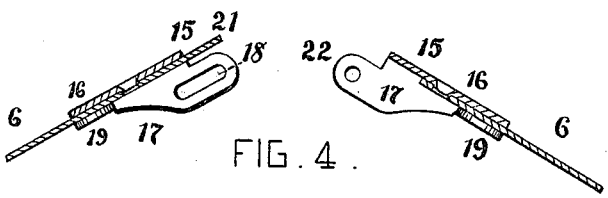
Figure 5:
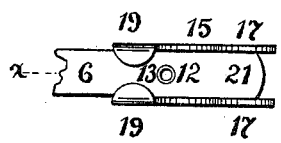
Figure 5:
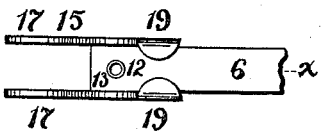
Figure 6:
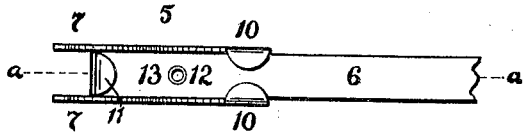
Figure 7:
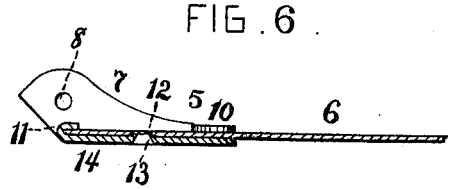
Figure 2:
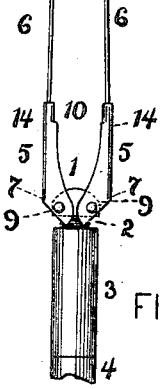

In the accompanying drawings, forming a part hereof, Figure 1 is a view of my improved net-frame spread as for use. Fig. 2 is a view showing the spreading mechanism released and the two portions of the frame folded together. Fig. 3 is an enlarged side elevation of the spreading and locking mechanism. Fig. 4 is a longitudinal sectional view of the parts shown in Fig. 3 at line X X of Fig. 5, and Fig. 5 is a plan view of the same. Fig. 6 is a plan view of one portion of the hinge connecting a side piece to the screw-handle coupling, and Fig. 7 is a longitudinal sectional view at line *a a* of Fig. 6.

Like numerals of reference wherever they occur indicate corresponding parts in all the figures.

1 is a screw shank or coupling designed for engaging with a thread 2, formed in a ferrule 3, mounted upon the extremity of a manipulating-handle 4.

5 5 are two hinge-pieces made of soft metal and designed for engaging with the flexible side rods or pieces 6. These hinge-pieces 5 are each provided with ears 7, perforated at 8 for the reception of a pivot 9, connecting such piece to the shank 1.

14 is the back of the hinge-piece, and 10 are lips which are turned over each edge of the rod 6, and 11 is a lip which is turned over the inner extremity of such rod. The rod 6 is perforated at 12, and the soft metal of the hinge-piece 5 is forced into such perforation, as at 13, firmly holding the parts against displacement. The perforations referred to also provide means for securing the net against slipping when placed upon the frame.

15 is a locking-hinge located at the outer extremities of the rods 6. The back 16 of one of these pieces is provided with ears 17, having therein a slot 18, the said piece being held upon the rod 6 by means of turned ears 19 and the metal of the piece being forced into the perforation 12 in the rod 6, as heretofore described. The other piece 15 is provided with ears 17, which are perforated at 22 for the reception of a pivot or pin 20, which passes through the slot 18. The extremity of one of the rods 6 projects, as at 21.

When constructed and arranged in accordance with the foregoing description, my improved fishing-net frame will be found admirably adapted to the uses and purposes for which it is intended. It is light, strong, and very simple in construction. By my arrangement the use of rivets or the equivalent for securing the steel rods to the hinge-piece is done away with, while the parts are firmly and securely united. The locking device at the outer extremity of the rod 6 is very simple, as while the two parts are secured to each other by the pin 20 the slots 18 permit a free movement of the parts toward and from each other, and the passing of the projection 21 beneath the opposite hinge-piece effectually holds the parts in place when the net is extended, and said parts may be folded together with the greatest facility.

Having now fully described my invention, what I claim as new therein, and desire to secure by Letters Patent, is—

In a landing-net, the combination with the handle, of a pair of spring side rods attached thereto, and a locking-hinge arranged to unite the outer ends of such rods and consisting of separate pieces, one attached to each rod and provided with ears 17, one set of ears being slotted at 18 and the other set perforated at 22, and a pivot-pin 20 passing through the slots and perforations in the ears 17 and thereby uniting the parts of the locking-hinge, the end, 21, of one of the side rods being extended beyond the end of the hinge-piece which is attached thereto, and being arranged, when the parts are in locked position, to extend under the opposite hinge-piece and thereby hold them in position, substantially as set forth.

JOHN G. LANDMAN.

Witnesses:
  A. M. PIERCE,
  EVELYN M. PIERCE.